United States Patent
Seong (10) Patent No.: US 9,853,253 B2
(45) Date of Patent: Dec. 26, 2017

(54) BATTERY PACK

(71) Applicant: SAMSUNG SDI CO., LTD., Yongin-si, Gyeonggi-do (KR)

(72) Inventor: Jae-Il Seong, Yopngin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 392 days.

(21) Appl. No.: 14/529,128

(22) Filed: Oct. 30, 2014

(65) Prior Publication Data
US 2015/0228933 A1 Aug. 13, 2015

(30) Foreign Application Priority Data
Feb. 12, 2014 (KR) .................. 10-2014-0016284

(51) Int. Cl.
| | |
|---|---|
| *H01M 2/02* | (2006.01) |
| *H01M 2/04* | (2006.01) |
| *H01M 2/22* | (2006.01) |
| *H01M 2/30* | (2006.01) |

(52) U.S. Cl.
CPC ....... *H01M 2/0202* (2013.01); *H01M 2/0404* (2013.01); *H01M 2/22* (2013.01); *H01M 2/30* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 2006/0040178 A1* | 2/2006 | Probst | A61N 1/375 429/176 |
| 2006/0216593 A1* | 9/2006 | Jung | H01M 2/06 429/178 |
| 2012/0183825 A1 | 7/2012 | Lee et al. | |
| 2013/0029208 A1 | 1/2013 | Seong et al. | |
| 2013/0029211 A1 | 1/2013 | Seong et al. | |

FOREIGN PATENT DOCUMENTS

| | | |
|---|---|---|
| KR | 10-2012-0082808 A | 7/2012 |
| KR | 10-2013-0014437 A | 2/2013 |
| KR | 10-2013-0014438 A | 2/2013 |

* cited by examiner

*Primary Examiner* — Miriam Stagg
*Assistant Examiner* — Carmen Lyles-Irving
(74) *Attorney, Agent, or Firm* — Lewis Roca Rothgerber Christie LLP

(57) ABSTRACT

A secondary battery includes a can having an opening at one end, an electrode assembly accommodated in the can through the opening, a cap plate that seals the opening, and an insulation plate below the cap plate. The can includes: a first surface that is convex; a second surface that faces the first surface and is concave; a third surface that is curved and connected to the first surface and the second surface to form a bottom surface; a first connection portion that connects the first surface and the third surface and has a round form having a first radius of curvature; and a second connection portion that connects the second surface and the third surface and has a round form having a second radius of curvature. At least one of the first radius of curvature and the second radius of curvature varies along a length of the third surface.

9 Claims, 7 Drawing Sheets

BATTERY PACK

CROSS-REFERENCE TO RELATED APPLICATION

This application claims priority to and the benefit of Korean Patent Application No. 10-2014-0016284, filed on Feb. 12, 2014, in the Korean Intellectual Property Office, the disclosure of which is incorporated herein by reference in its entirety.

BACKGROUND

1. Field

Aspects of the present invention relate to a secondary battery.

2. Description of the Related Art

Due to developments in wireless Internet and communication technology, the use of mobile electronic appliances that operate using a battery instead of an external power supply has become common. Among these devices, mobile computers are compact and easy to carry, and thus, are widely used for work or personal purposes at fixed locations or while traveling. Consequently, mobile computers may include a battery pack as a power source. A battery pack may include a plurality of secondary batteries that may be repeatedly charged and discharged to provide a sufficient power output.

With the growth in the market of mobile electronic appliances, demand for batteries that are suitable for running mobile electronic appliances is increasing, and flexibility of the appliances in regard to use, movement, and storage of the mobile electronic appliances and durability thereof against impacts, are also in increasing demand. Accordingly, demand for batteries that allow for such flexibility in appliances is also increasing.

SUMMARY

One or more embodiments of the present invention include secondary batteries.

Additional aspects will be set forth in part in the description which follows and, in part, will be apparent from the description, or may be learned by practice of the presented embodiments.

According to one or more embodiments of the present invention, a secondary battery includes: a can having an opening at one end; an electrode assembly accommodated in the can; a cap plate sealing the opening; and an insulation plate located between the cap plate and the electrode assembly, wherein the can includes: a first surface that is convex; a second surface that faces the first surface and is concave; a third surface that is curved and is connected to the first surface and the second surface to form a bottom surface; a first connection portion that connects the first surface and the third surface and having a first radius of curvature; and a second connection portion that connects the second surface and the third surface and having a second radius of curvature, wherein at least one of the first radius of curvature and the second radius of curvature varies along a length of the third surface.

At least one of the first radius of curvature and the second radius of curvature may be bisymmetrical along the length of the third surface with respect to a center of the first surface or a center of the second surface, respectively.

At least one of the first radius of curvature and the second radius of curvature may increase along the length of the third surface from a center of the first surface or a center of the second surface, respectively, to an end of the third surface.

At least one of the first radius of curvature and the second radius of curvature may linearly vary along the length of the third surface from a center of the first surface or a center of the second surface, respectively, to an end of the third surface.

At least one of the first radius of curvature and the second radius of curvature may linearly increase along the length of the third surface.

The first radius of curvature at a point on the first connection portion may be identical to the second radius of curvature at a point on the second connection portion facing the point of the first connection portion.

The second radius of curvature at a point on the second connection portion may be smaller than the first radius of curvature at a point on the first connection portion facing the point of the second connection portion.

The first radius of curvature may be uniform along a length of the third surface.

The secondary battery may further include: a terminal plate located between the insulation plate and the electrode assembly and electrically connected to the electrode assembly; and an electrode pin located on the cap plate and passing through the cap plate and the insulation plate to be connected to the terminal plate.

According to one or more embodiments of the present invention, a secondary battery includes: a can that has an opening at one end and is curved; an electrode assembly accommodated in the can and including a first electrode plate, a second electrode plate, and a separator between the first electrode plate and the second electrode plate; and a cap plate sealing the opening, wherein the can includes: a first surface that is convex; a second surface that faces the first surface and is concave; a third surface that is curved and is connected to the first surface and the second surface to form a bottom surface; a first connection portion that connects the first surface and the third surface and having a first thickness; and a second connection portion that connects the second surface and the third surface and having a second thickness, wherein at least one of the first thickness and the second thickness varies along a length of the third surface.

At least one of the first thickness and the second thickness may be bisymmetrical along the length of the third surface with respect to a center of the first surface or a center of the second surface, respectively.

At least one of the first thickness and the second thickness may increase along the length of the third surface from a center of the first surface or a center of the second surface, respectively, to an end of the third surface.

At least one of the first thickness and the second thickness may linearly vary along the length of the third surface from a center of the first surface or a center of the second surface, respectively, to an end of the third surface.

At least one of the first thickness and the second thickness may linearly increase along the length of the third surface.

The first thickness at a point on the first connection portion may be identical to the second thickness at a point on the second connection portion facing the point of the first connection portion.

The second thickness at a point on the second connection portion may be smaller than the first thickness at a point on the first connection portion facing the point of the second connection portion.

The secondary battery may further include: an insulation plate located between the cap plate and the electrode assembly; a terminal plate located between the insulation plate and the electrode assembly and electrically connected to the electrode assembly; and an electrode pin located on the cap plate and passing through the cap plate and the insulation plate to be connected to the terminal plate.

A first electrode tab may be coupled to the first electrode plate, and a second electrode tab may be coupled to the second electrode plate, and the first electrode tab may be connected to the cap plate, and the second electrode tab may be connected to the terminal plate.

The cap plate may include an anchor protruding toward the electrode assembly, and the insulation plate may include an anchor groove into which the anchor is inserted.

The first thickness may be uniform along the length of the third surface.

BRIEF DESCRIPTION OF THE DRAWINGS

These and/or other aspects of the embodiments will become apparent and more readily appreciated from the following description, taken in conjunction with the accompanying drawings.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to illustrate aspects of the present description. Expressions such as "at least one of," when preceding a list of elements, modify the entire list of elements and do not modify the individual elements of the list.

Hereinafter, the inventive concept will be described more fully with reference to the accompanying drawings, in which exemplary embodiments of the invention are shown. However, these embodiments are provided so that this disclosure will be thorough and complete to those of ordinary skill in the art. As the inventive concept allows for various changes and many different forms, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope of the inventive concept are encompassed in the inventive concept. When describing the invention, like reference numerals denote like elements even when illustrated in difference embodiments.

While such terms as "first," "second," etc., may be used to describe various components, such components must not be limited to the above terms. The above terms are used only to distinguish one component from another.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including" or "having," etc., are intended to indicate the existence of features, numbers, steps, actions, components, parts, or combinations thereof disclosed in the specification, and are not intended to preclude the possibility that one or more other features, numbers, steps, actions, components, parts, or combinations thereof may exist or may be added.

The present invention will be described below in more detail with reference to the accompanying drawings, in which exemplary embodiments of the invention are shown.

Figure 1:
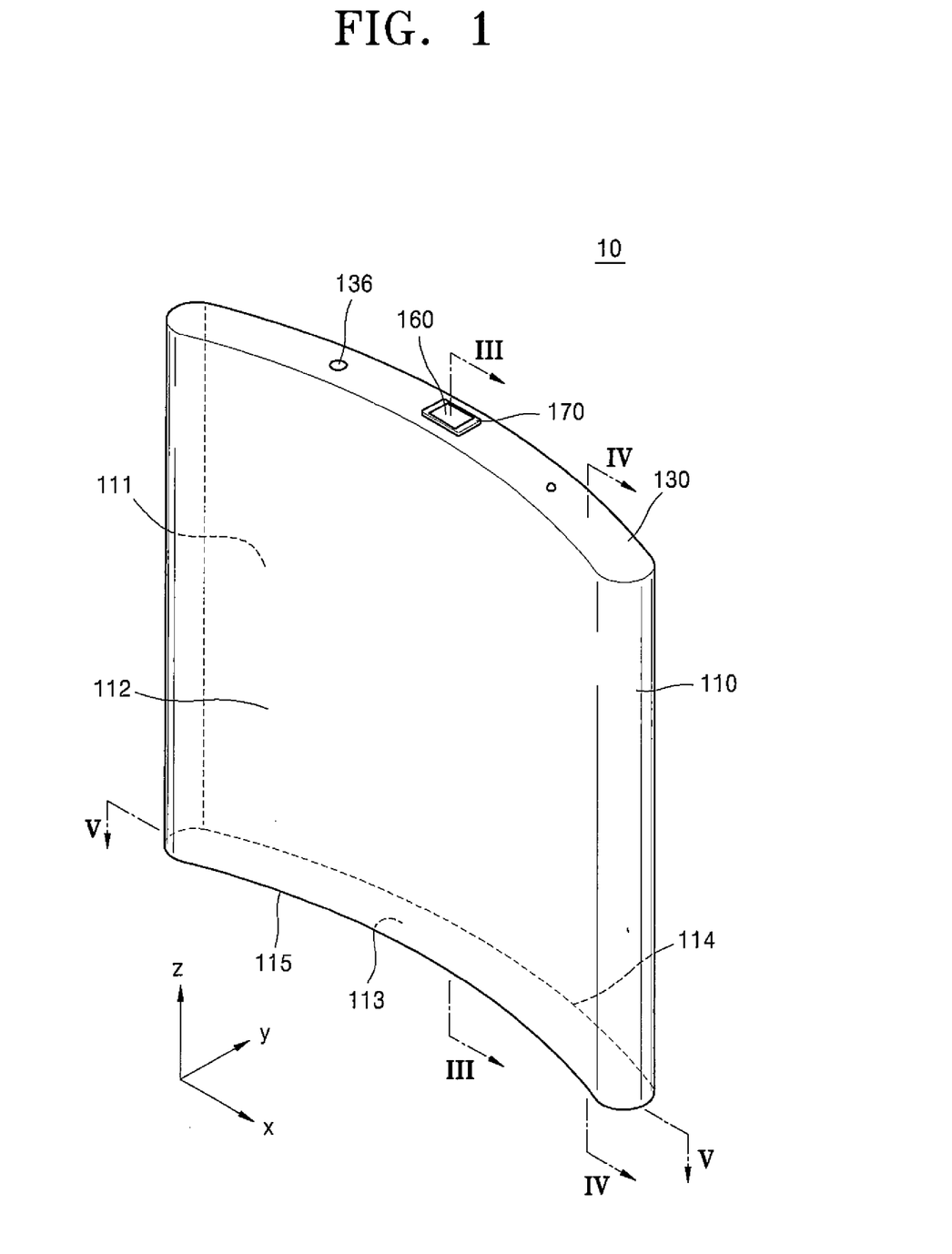
FIG. 1 is a perspective view illustrating a secondary battery according to an embodiment of the present invention.
Figure 2:
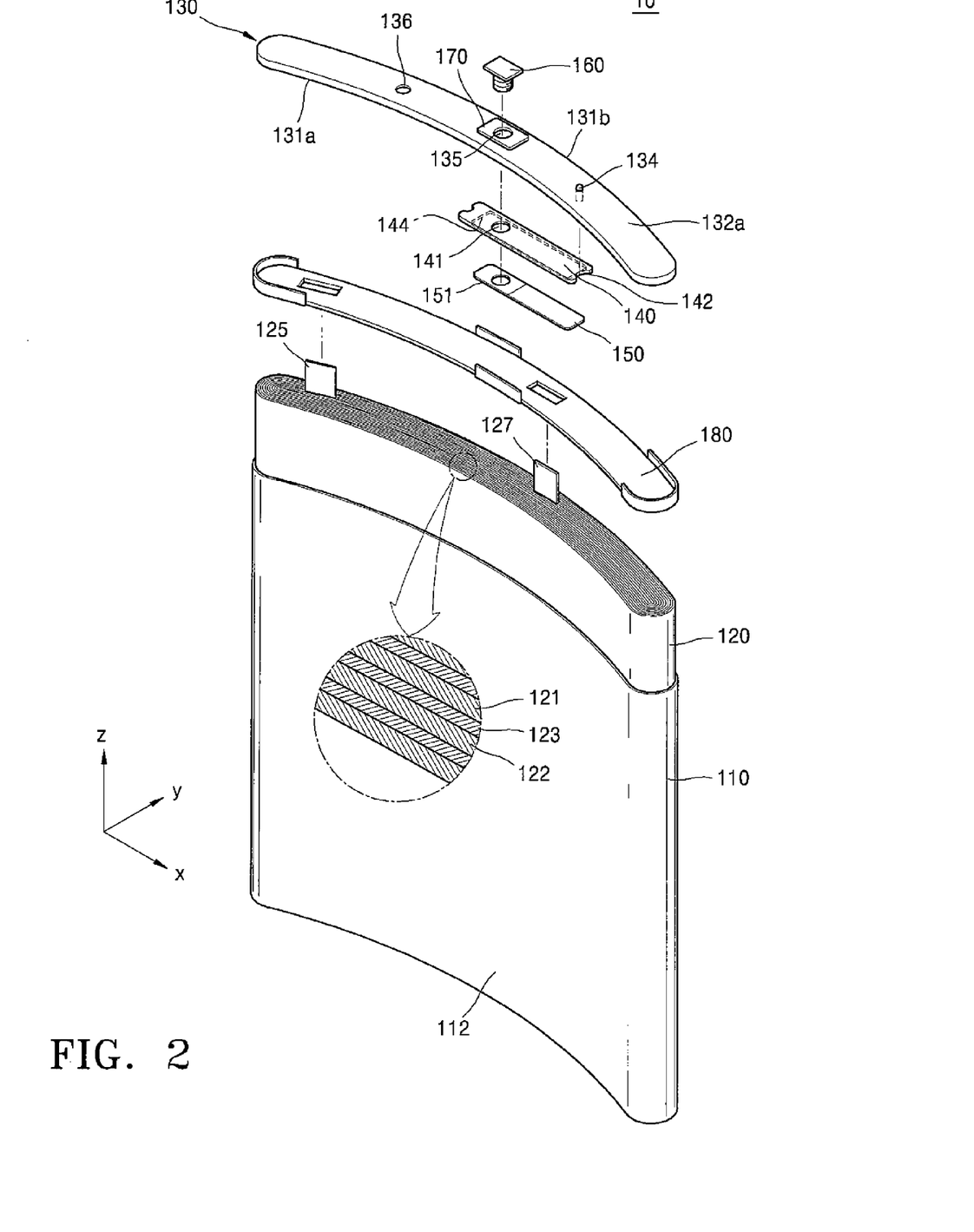
FIG. 2 is a partially exploded perspective view illustrating the secondary battery of FIG. 1.

FIG. 1 is a perspective view illustrating a secondary battery 10 according to an embodiment of the present invention. FIG. 2 is an exploded perspective view illustrating the secondary battery 10 illustrated in FIG. 1.

Referring to FIGS. 1 and 2, the secondary battery 10 may include a can 110 having an opening formed at one end, an electrode assembly 120 accommodated in the can 110, and a cap plate 130 coupled to the end of the can 110.

The opening is formed at the end of the can 110 so that the electrode assembly 120 may be inserted into the can 110. The opening is curved, and accordingly, the can 110 is also curved, thereby forming the curved external appearance of the secondary battery 10. The can 110 may be formed of aluminum or an aluminum alloy. Thus, the can 110 may protect the electrode assembly 120 from an external impact and function as a heat dissipation plate that transmits heat to the outside that is generated during charging and discharging operations of the electrode assembly 120.

The can 110 described above may include a third surface 113 which is a bottom surface, a first surface 111 which is a lateral surface bent from the third surface 113, and a second surface 112 which is another lateral surface bent from the third surface 113 and oriented to face the first surface 111.

The first surface 111 may be convex, and the second surface 112 may be concave. In detail, the first surface 111 may be curved outwardly, and the second surface 112 may be curved inwardly.

Also, the can 110 may include a first connection portion 114 that connects the first surface 111 and the third surface 113 and a second connection portion 115 that connects the second surface 112 and the third surface 113. The first connection portion 114 and the second connection portion 115 may respectively have a first radius of curvature and a second radius curvature (shown in FIGS. 3 and 4, as discussed below). Moreover, the first connection portion 114 may have a first thickness, and the second connection portion 115 may have a second thickness (shown in FIGS. 3 and 4, as discussed below).

According to the above embodiment of the present invention, the first radius of curvature may be a radius of curvature of a surface of the first connection portion 114 formed inside the can 110, or a radius of curvature of a surface of the first connection portion 114 that forms an outer portion of the can 110. Also, similarly to the first radius of curvature, the second radius of curvature may be a radius of curvature of the second connection portion 115.

Also, the first thickness and the second thickness may be values that are respectively measured at predetermined points of the first connection portion 114 and the second connection portion 115. The first thickness and the second thickness may be the shortest distances between an external surface and an internal surface of the can 110 of the first connection portion 114 and the second connection portion 115, respectively.

The electrode assembly 120 may include a first electrode plate 121, a second electrode plate 122, and a separator 123 disposed between the first electrode plate 121 and the second electrode plate 122. The electrode assembly 120 may be manufactured by sequentially stacking the first electrode plate 121, the separator 123, and the second electrode plate 122 and winding these in a jelly-roll form. Alternatively, the electrode assembly 120 may be formed by sequentially stacking the first electrode plate 121, the separator 123, and the second electrode plate 122.

The first electrode plate 121 may be a positive electrode film or a negative electrode film. When the first electrode plate 121 is a positive electrode film, the second electrode plate 122 may be a negative electrode film. In contrast, when the first electrode plate 121 is a negative film, the second electrode plate 122 may be a positive electrode film. In other words, the first electrode plate 121 and the second electrode plate 122 may have electrically different polarities and are not limited to a predetermined polarity. However, for convenience of description, the first electrode plate 121 formed of a positive electrode film and the second electrode plate 122 formed of a negative electrode film will be described.

The first electrode plate 121 may include a first active material portion coated with a first active material and a first non-coated portion which is not coated with the first active material. The first active material portion is formed by coating, for example, at least a portion of a surface of an aluminum plate with a first active material, and the rest of the surface of the aluminum plate that is not coated with the first active material may be the first non-coated portion. The first active material may be a positive active material such as a lithium-containing transition metal oxide, e.g. $LiCoO_2$, $LiNiO_2$, $LiMnO_2$, or $LiMnO_4$, or a lithium chalcogenide compound.

The second electrode plate 122 may include a second active material portion coated with a second active material and a second non-coated portion which is not coated with the second active material. The second active material portion is formed by coating, for example, at least a portion of a surface of a copper plate with the second active material, and the rest of the surface of the copper plate that is not coated with the second active material may be the second non-coated portion. The second active material may be, for example, a negatively conductive active material. In detail, the second active material may be a carbon material such as crystalline carbon, amorphous carbon, a carbon complex, or carbon fibers, or it may be a lithium metal or lithium alloy.

The separator 123 may be a porous polymer layer such as a polyethylene film or a polypropylene film, may be in the form of a woven or nonwoven fiber including polymer fibers, may include ceramic particles, and may be formed of a solid polymer electrolyte. The separator 123 may be formed of an independent film or a nonconductive, porous layer formed on the first electrode plate 121 or the second electrode plate 122. The separator 123 is formed to electrically separate the first electrode plate 121 and the second electrode plate 122 from each other, and the form of the separator 123 may not necessarily be the same as the form of the first electrode plate 121 or the second electrode plate 122.

A first electrode tab 125 and a second electrode tab 127 are included to electrically connect the electrode assembly 120 to the outside, and to this end, the first electrode tab 125 is electrically connected to the first electrode plate 121, and the second electrode tab 127 may be electrically connected to the second electrode plate 122. In detail, the first electrode tab 125 may be connected to the first non-coated portion via welding or the like, and the second electrode tab 127 may be connected to the second non-coated portion via welding or the like.

The cap plate 130 may seal the opening of the can 110. Like the can 110, the cap plate 130 may be formed of a metallic material such as aluminum or an aluminum alloy. The cap plate 130 and the can 110 may be bonded by laser welding or the like.

In addition, because the opening of the can 110 is curved, and the cap plate 130 seals the opening, the cap plate 130 may also be curved. In detail, the cap plate 130 may have a first lateral surface 131a, which is concave, and a second lateral surface 131b, which is convex, and the first and second lateral surfaces 131a and 131b are parallel to each other. The first lateral surface 131a and the second lateral surface 131b may have the same curvature as the opening of the can 110.

Also, the cap plate 130 may include a first plate surface 132a and a second plate surface that are flat and connect the first lateral surface 131a and the second lateral surface 131b. The first plate surface 132a faces outward, and the second plate surface faces inward toward the electrode assembly 120.

The cap plate 130 may include an electrolyte inlet 136. After the cap plate 130 is coupled to the can 110, an electrolyte is injected into the can 110 through the electrolyte inlet 136, and when injection of the electrolyte is completed, the electrolyte inlet 136 may be hermetically sealed.

An insulation plate 140 and a terminal plate 150 may be disposed below the cap plate 130. The insulation plate 140 may be formed of an insulation material so as to prevent a short circuit between the terminal plate 150 and the cap plate 130. An insulation case 180 which electrically insulates the electrode assembly from the cap plate 130 and the terminal plate 150 is located between the cap plate 130 and the electrode assembly 120.

In one embodiment, the cap plate 130 may include an anchor 134 protruding from the second plate surface towards the electrode assembly 120, and an anchor groove 142 into which the anchor 134 is inserted may be formed at a lateral end portion of the insulation plate 140. The anchor groove 142 may be coupled to the anchor 134 to thereby prevent distortion of a position of the insulation plate 140.

Also, the cap plate 130 may further include a coupling tip protruding from the second plate surface toward the electrode assembly 120, and the insulation plate 140 may further include a coupling groove at a position corresponding to the coupling tip to accommodate the coupling tip.

The terminal plate 150 is mounted in a mounting groove 144 formed in the insulation plate 140. The terminal plate 150 may be formed of a nickel (Ni) alloy, and a lateral end portion of the terminal plate 150 may be electrically connected to the second electrode tab 127.

An electrode pin 160 may be disposed on the first plate surface 132a of the cap plate 130. The electrode pin 160 may be inserted into terminal through-holes 135, 141, and 151 respectively formed in the cap plate 130, the insulation plate 140, and the terminal plate 150 in order to contact the terminal plate 150. When the terminal plate 150 contacts the second electrode tab 127 of the electrode assembly 120, the electrode pin 160 is electrically connected to the second electrode plate 122. The first electrode tab 125 may be electrically connected to the cap plate 130.

A gasket 170 may be formed of an insulating material like the insulation plate 140 to thereby insulate the electrode pin 160 and the cap plate 130 from each other.

The can 110 according to one embodiment will be described in detail below.

Figure 3:
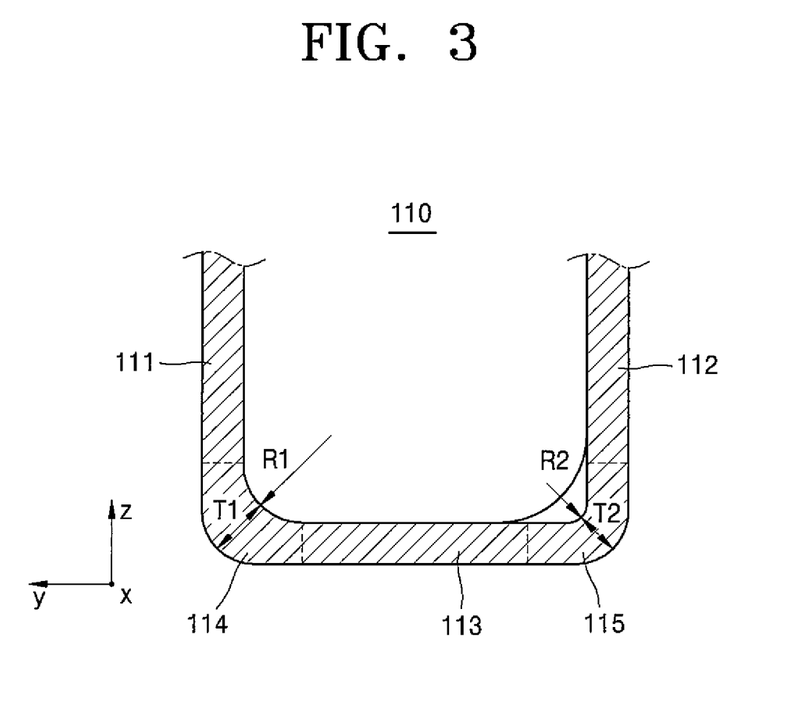
FIG. 3 is a cross-sectional view of a can of the secondary battery of FIG. 1 cut along a line III-III of FIG. 1.
Figure 4:
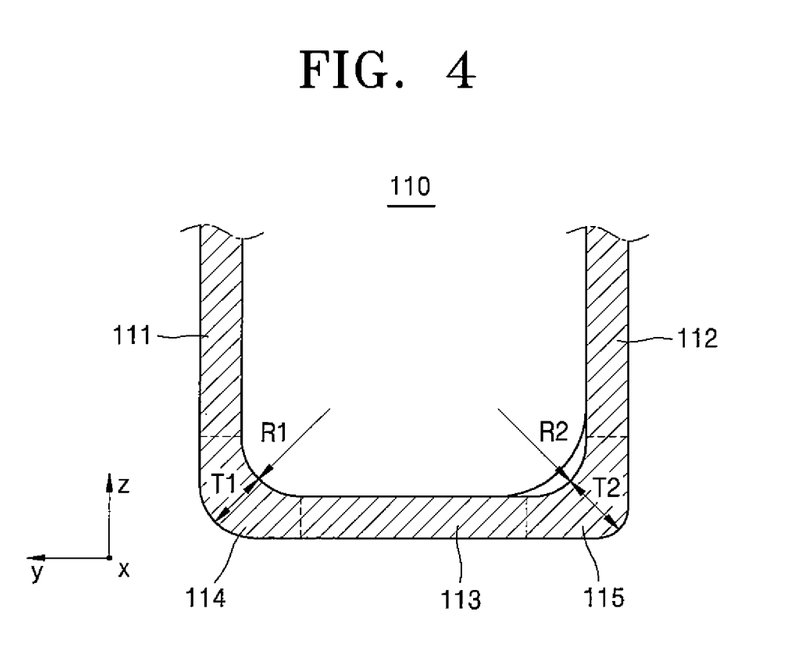
FIG. 4 is a cross-sectional view of the can of the secondary battery of FIG. 1 cut along a line IV-IV of FIG. 1.
Figure 5:
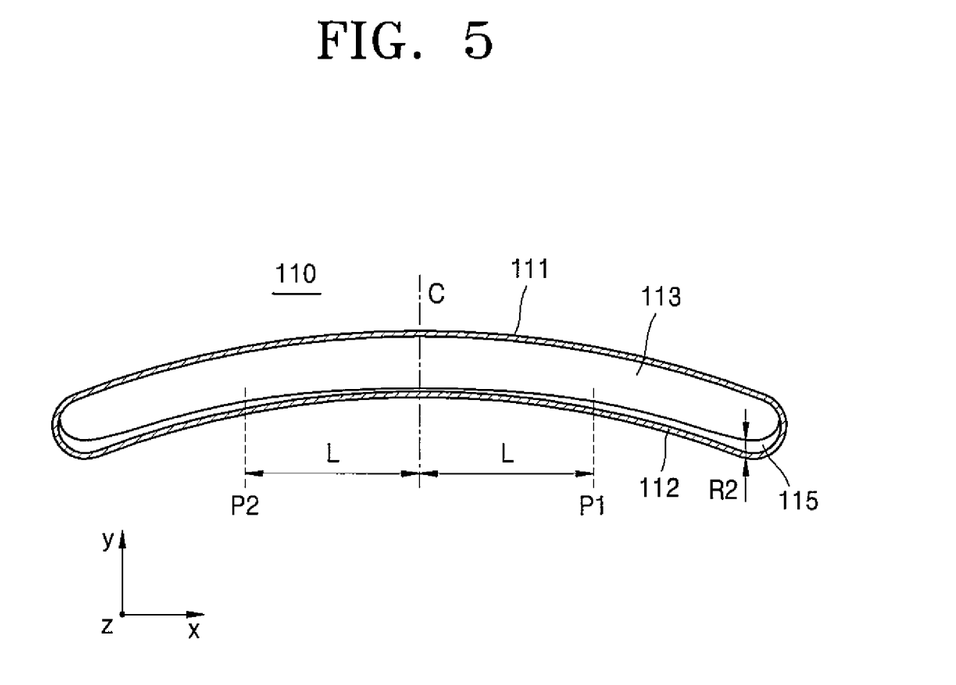
FIG. 5 is a cross-sectional view of the can of the secondary battery of FIG. 1 cut along a line V-V of FIG. 1.

FIG. 3 is a cross-sectional view of the can 110 cut along a line of FIG. 1. FIG. 4 is a cross-sectional view of the can 110 cut along a line IV-IV of FIG. 1. FIG. 5 is a cross-sectional view of the can 110 cut along a line V-V of FIG. 1.

Referring to FIGS. 3 through 5, and as described above, the can 110 may include the first surface 111, the second surface 112, the third surface 113, the first connection portion 114, and the second connection portion 115.

The first connection portion 114 and the second connection portion 115 may be curved surfaces having a first radius of curvature R1 and a second radius of curvature R2, respectively, as described above.

The first radius of curvature R1 and the second radius of curvature R2 may be determined at different positions along the first connection portion 114 and the second connection portion 115, respectively. For example, the first radius of curvature R1 may be a radius of curvature of a portion of the first connection portion 114 disposed inside the can 110. Alternatively, the first radius of curvature R1 may be a radius of curvature of a portion of the first connection portion 114 disposed outside the can 110. Alternatively, the first radius of curvature R1 may be a radius of curvature of a central portion of the first connection portion 114.

The second radius of curvature R2 may also be defined similarly to the first radius of curvature R1. For example, the second radius of curvature R1 may be a radius of curvature of a portion of the second connection portion 115 disposed inside the can 110, a radius of curvature of a portion of the second connection portion 115 disposed outside the can 110, or a radius of curvature of a central portion of the second connection portion 115.

However, for convenience of description, the first radius of curvature R1 being a radius of curvature of a portion of the first connection portion 114 disposed inside the can 110 and the second radius of curvature R2 being a radius of curvature of a portion of the second connection portion 115 disposed inside the can 110 will be described below.

Concurrently, the first connection portion 114 and the second connection portion 115 may have a first thickness T1 and a second thickness T2, respectively. The first thickness T1 and the second thickness T2 may be defined as described above. However, for convenience of description, the description will focus on the first thickness T1 being the shortest distance between a portion of the first connection portion 114 disposed inside the can 110 to a portion of the first connection portion 114 disposed outside the can 110, at a predetermined point, and the second thickness T2 being the shortest distance between a portion of the second connection portion 115 disposed inside the can 110 to a portion of the second connection portion 115 disposed outside the can 110, at a predetermined point of the second connection portion 115.

At least one of the first radius of curvature R1 and the second radius of curvature R2 formed as described above may vary along the lengthof the third surface 113. For example, only the first radius of curvature R1 may vary along the length of the third surface 113. In said embodiment, the second radius of curvature R2 may be uniform along the length of the third surface 113. Also, alternatively, only the second radius of curvature R2 may vary along the length of the third surface 113. In this embodiment, the first radius of curvature R1 may be uniform along the length of the third surface 113.

Alternatively, both the first radius of curvature R1 and the second radius of curvature R2 may vary along the length of the third surface 113. Hereinafter, for convenience of description, the description will focus on an embodiment in which only the second radius of curvature R2 varies along the length of the third surface 113, and the first radius of curvature R1 is uniform along the length of the third surface 113.

The second radius of curvature R2 may be differently formed at respective points of the second connection portion 115 along the lengths of the first surface 111, the second surface 112 or the third surface 113. In detail, the second radius of curvature R2 may vary from a center of the second surface 112 or a center C of the third surface 113 to an end of the second surface 112 or an end of the third surface 113. In particular, the second radius of curvature R2 may vary from the center C of the third surface 113 to the end of the third surface 113. The center of the first surface 111, a center of the second surface 112, and the center C of the third surface 113 may be identical to one another, and hereinafter, the description will focus on the center C of the third surface 113 for convenience of description.

Also, the second radius of curvature R2 may be symmetrical with respect to the center C of the third surface 113, as shown in FIG. 5. For example, the second radius of curvature R2 may be identical at points that are the same distance from the center C of the third surface 113. In detail, a second radius of curvature R2 at a first point P1 at a distance L from the center C of the third surface 113 on one side of the third surface 113 may be the same as a second radius of curvature R2 at a second point P2 at the distance L from the center C of the third surface 113 on the other side of the third surface. Accordingly, the second curvature R2 may be bisymmetrical with respect to the center C of the third surface 113.

The second radius of curvature R2 as described above may increase from the center C of the third surface 113 toward the two ends of the third surface 113. The second radius of curvature R2 may linearly vary from the center C of the third surface 113 based on to the distance from the center C.

Also, the second curvature R2 may gradually increase from the center C of the third surface 113 to the two ends of the third surface 113. The second curvature R2 may linearly increase from the center C of the third surface 113 to the two ends of the third surface 113.

For example, when the second radius of curvature R2 at the center C of the third surface 113 is 2 mm, the second radius of curvature R2 at a point 1 mm away from the center C of the third surface 113 may be 3 mm. Also, the second radius of curvature R2 at a point 2 mm away from the center C of the third surface 113 may be 4 mm. The second radius of curvature R2 may vary according to the above-described relationship of the second radius of curvature R2 varying proportionally according to a distance from the center C. A ratio at which the second radius of curvature R2 varies according to the distance from the center C or a size of the second radius of curvature R2 is not limited to the above-described embodiment, and the above-described relationship may include all examples where the second radius of curvature R2 linearly varies from the center C of the third surface 113 to the two ends of the third surface 113.

The first radius of curvature R1, described above, at a point on the first connection portion 114, may be different from the second radius of curvature R2 at a point on the second connection portion 115 facing the point of the first connection portion 114. In detail, the second radius of curvature R2 at the point of the second connection portion 115 may be smaller than the first radius of curvature R1 at the point of the first connection portion 114 facing the point of the second connection portion 115.

For example, sizes of the first radius of curvature R1 and the second radius of curvature R2 at a first distance L1 from the center C of the third surface 113 may be different from each other. In detail, a size of the first radius of curvature R1 at the first distance L from the center C of the third surface 113 may be greater than a size of the second radius of curvature R2 at the first distance L from the center C of the third surface 113.

In particular, a size of the first radius of curvature R1 may be equal to or greater than a maximum value of the second radius of curvature R2. In this embodiment, the second radius of curvature R2 may be always smaller than the first radius of curvature R1 from the center C to the two ends of the third surface 113.

Also, alternatively, the size of the second radius of curvature R2 may be equal to or greater than some values of the first radius of curvature R1. In this embodiment, the first radius of curvature R1 may be greater than the second radius of curvature R2 at a predetermined distance from the center C of the third surface 113, and after the predetermined distance from the center C of the third surface 113, the first radius of curvature R1 may be smaller than the second radius of curvature R2.

The can 110 may be curvedly formed by using a jig. For example, the can 110 may be mounted in the jig, which is curvedly formed, and may be compressed. In one embodiment, the first surface 111 may be convex and the second surface 112 may be concave. Also, the first connection portion 114 may be convex and the second connection portion 115 may be concave.

When the can 110 is curvedly formed, the second radius of curvature R2 is linearly deformed as a result of the deformation of the can 110 from a pressure applied using the jig. In detail, because the second radius of curvature R2 of the second connection portion 115 at the center C of the third surface 113 is smaller than other portions, the can 110 may be easily deformed. Also, a compressive stress generated at the center C of the third surface 113 may be effectively absorbed at a portion of the second radius of curvature R2 which is relatively small.

Also, because the first radius of curvature R1 is greater than the second radius of curvature R2 at the center C of the third surface 113, the first connection portion 114 may endure a tensile stress when the first connection portion 114 is tensioned. In particular, the first radius of curvature R1 is formed to be greater than the second radius of curvature R2 up to a predetermined distance from the center C of the third surface 113 so as to prevent damage of the can 110 when the can 110 is deformed. Accordingly, the secondary battery 10 having a desired radius of curvature may be manufactured even with a small amount of force used to deform the can 110.

In a further embodiment, at least one of the first thickness T1 and the second thickness T2 may vary along the length of the third surface 113.

For example, the first thickness T1 may be vary along the length of the third surface 113, and the second thickness T2 may be uniform along the length of the third surface 113. Alternatively, the first thickness T1 may be uniform along the length of the third surface 113, and the second thickness T2 may vary along the length of the third surface 113. Alternatively, the first thickness T1 and the second thickness T2 both may vary along the length of the third surface 113. However, for convenience of description, the description will focus on an embodiment in which the first thickness T1 is uniform along the length of the third surface 113, and the second thickness T2 varies along the length of the third surface 113.

The second thickness T2 may vary along the length of the third surface 113. In detail, the second thickness T2 may be bisymmetrical with respect to the center C of the third surface 113. In other words, the second thickness T2 may be bisymmetrical with respect to the center C of the third surface 113 to the two ends of the third surface 113.

The second thickness T2 may gradually increase from the center C to the two ends of the third surface 113. Also, the second thickness T2 may linearly vary from the center C to the two ends of the third surface 113. Moreover, the second thickness T2 may also linearly increase from the center C to the two ends of the third surface 113.

When the first thickness T1 and the second thickness T2 are formed differently from each other, the first thickness T1 at a point on the first connection portion 114 and the second thickness T2 at a point on the second connection portion 115 facing the point of the first connection portion 114 may be different from each other. In detail, the second thickness T2 at a point on the second connection portion 115 may be smaller than the first thickness T1 at a point on the first connection portion 114 facing the point of the second connection portion 115.

In this embodiment, the first thickness T1 may be equal to or greater than a maximum of the second thickness T2. Accordingly, the first thickness T1 may be greater than the second thickness T2 along the entire length of the third surface 113.

Alternatively, the first thickness T1 may be equal to or greater than the second thickness T2 at a point on the second connection portion 115 away from the center C of the third surface 113 by a predetermined distance. In this embodiment, the first thickness T1 may be greater than the second thickness T2 from the center C of the third surface 113 up to a predetermined distance, and after the predetermined distance from the center C of the third surface 113, the first thickness T1 may be smaller than the second thickness T2.

In particular, in the above-described embodiment of the present invention, the second thickness T2 decreases from the center C to the two ends of the third surface 113 so that deformation of the can 110 due to a compressive stress applied to the second surface 112 and the second connection portion 115 may be easily induced. Moreover, at a predetermined distance from the center C of the third surface 113, the first thickness T1 may be smaller than the second thickness T2, and thus, a force needed for deformation of the can 110 in the secondary battery 10 may be reduced.

In addition, the first thickness T1 may be uniform along the length of the third surface 113 in order to support a tensile stress applied to the first connection portion 114 from the deformation of the first surface 111, thereby preventing damage to the can 110.

Figure 6:
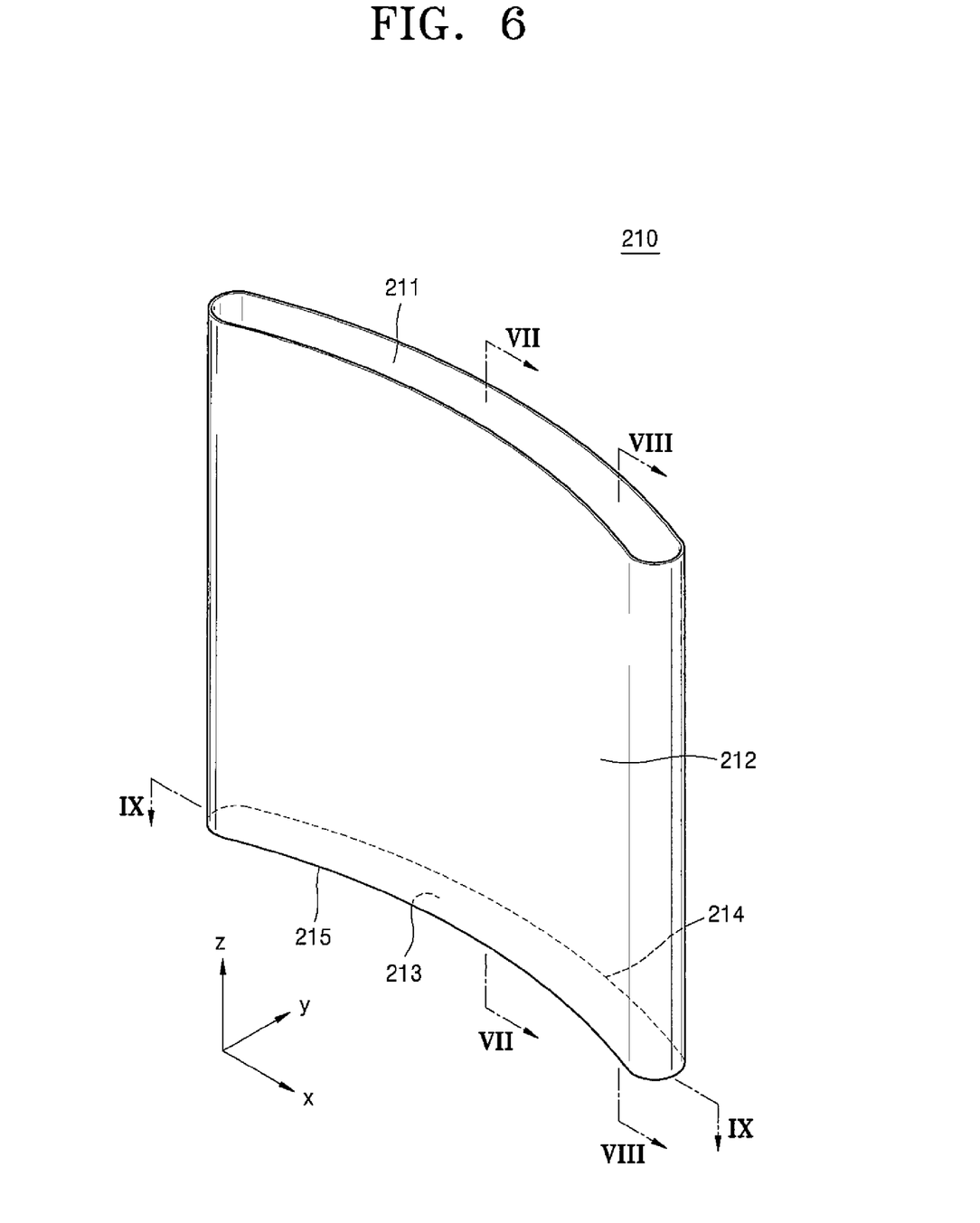
FIG. 6 is a perspective view illustrating a can according to another embodiment of the present invention.
Figure 7:
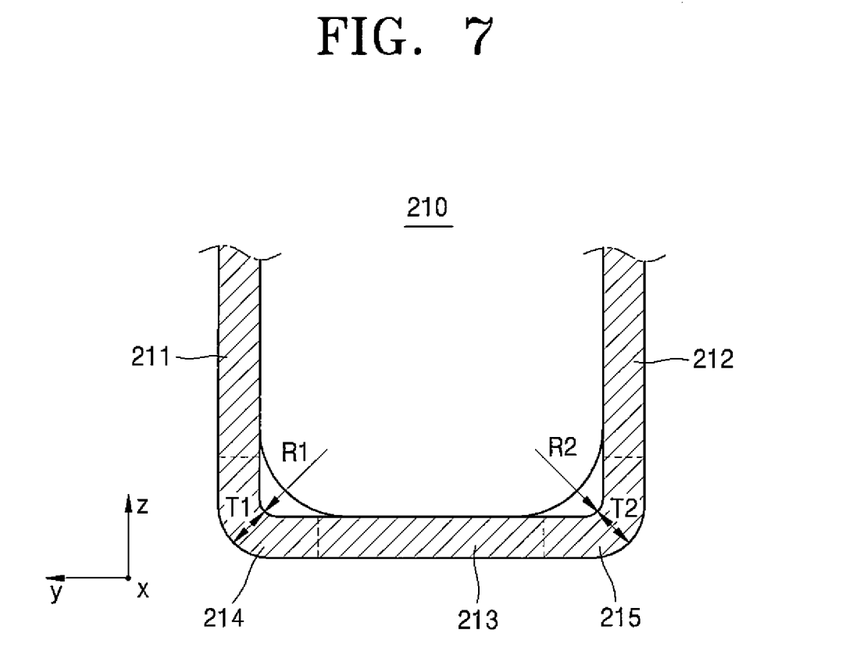
FIG. 7 is a cross-sectional view of the can of FIG. 6 cut along a line VII-VII of FIG. 6.
Figure 8:
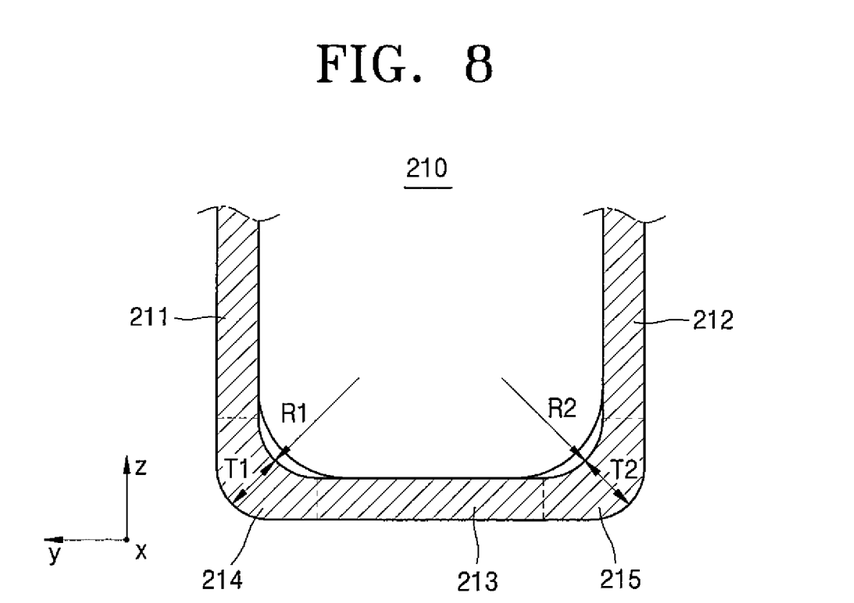
FIG. 8 is a cross-sectional view of the can of FIG. 6 cut along a line of FIG. 6.
Figure 9:
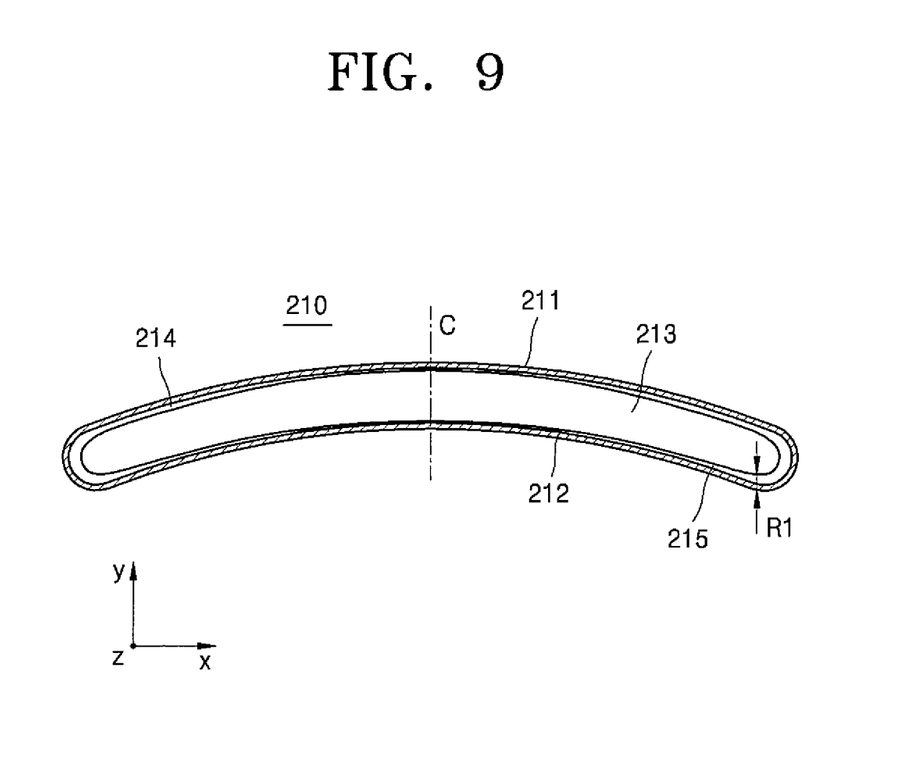
FIG. 9 is a cross-sectional view of the can of FIG. 6 cut along a line IX-IX of FIG. 6.

FIG. 6 is a perspective view illustrating a can 210 according to another embodiment of the present invention. FIG. 7 is a cross-sectional view of the can 210 cut along a line VII-VII of FIG. 6. FIG. 8 is a cross-sectional view of the can 210 cut along a line VIII-VIII of FIG. 6. FIG. 9 is a cross-sectional view of the can 210 cut along a line IX-IX of FIG. 6.

Referring to FIGS. 6 and 7, the can 210 may include a first surface 211, a second surface 212, a third surface 213, a first connection portion 214, and a second connection portion 215. The first surface 211, the second surface 212, the third surface 213, the first connection portion 214, and the second connection portion 215 may be the same or similar as their corresponding elements described above.

The first connection portion 214 and the second connection portion 215 may have round forms respectively having a first radius of curvature R1 and a second radius of curvature R2. Also, the first connection portion 214 and the second connection portion 215 may respectively have a first thickness T1 and a second thickness T2. The first radius of curvature R1, the second radius of curvature R2, the first connection portion 214, and the second connection portion 215 are the same or similar as the corresponding elements described above, and thus, redundant descriptions thereof will be omitted.

At least one of the first radius of curvature R1 and the second radius of curvature R2 may vary along the length of the third surface 213. Also, at least one of the first thickness T1 and the second thickness T2 may vary along the length of the third surface 213. Hereinafter, for convenience of description, the description will focus on an embodiment in which both the first radius of curvature R1 and the second radius of curvature R2 vary along the length of the third surface 213, and both the first thickness T1 and the second thickness T2 vary along the length of the third surface 213.

First, when both the first radius of curvature R1 and the second radius of curvature R2 vary, the first radius of curvature R1 and the second radius of curvature R2 may vary along the length of the third surface 213. In one embodiment, the first radius of curvature R1 and the second radius of curvature R2 may be bisymmetrical with respect to a center C of the third surface 213. In detail, the first radius of curvature R1 may be bisymmetrical with respect to the center C of the third surface 213, and the second radius of curvature R2 may be bisymmetrical with respect to the center C of the third surface 213.

The first radius of curvature R1 and the second radius of curvature R2 may linearly vary from the center C to two ends of the third surface 213. In particular, the first radius of curvature R1 and the second radius of curvature R2 may linearly increase from the center C to the two ends of the third surface 213.

The first radius of curvature R1 and the second radius of curvature R2 at a predetermined distance from the center C of the third surface 213 may be the same or different from each other. When the first radius of curvature R1 and the second radius of curvature R2, at a predetermined distance from the center C of the third surface 213, are different from each other, the first radius of curvature R1 may be greater than the second radius of curvature R2. However, for convenience of description, the description will focus on an embodiment in which the first radius of curvature R1 at a point on the first connection portion 214 and the second radius of curvature R2 at a point on the second connection portion 215 facing the point at the first connection portion 214 are the same. In other words, the description will focus on an embodiment in which the first radius of curvature R1 and the second radius of curvature R2 are the same along the length of the third surface 213.

Further, the first thickness T1 and the second thickness T2 may also linearly vary from the center C to the two ends of the third surface 213. In this embodiment, the first thickness T1 and the second thickness T2 may linearly increase from the center C to the two ends of the third surface 213.

The first thickness T1 and the second thickness T2 at a predetermined distance from the center C of the third surface 213 may be the same or different from each other. When the first thickness T1 and the second thickness T2 are different from each other, the first thickness T1 may be greater than the second thickness T2. However, for convenience of description, the description will focus on an embodiment in which the first thickness T1 and the second thickness T2 are the same from the center C to the two ends of the third surface 213.

The can 210 formed as described above may be curvedly formed by using a jig as described above. When the can 210 is pressed via the jig, the first radius of curvature R1 and the second radius of curvature R2 and the first thickness T1 and the second thickness T2 at center portions of the first connection portion 214 and the second connection portion 215 may be respectively smaller and thinner than other portions, thereby reducing a force applied to the can 210 when deforming the can 210. Moreover, as the can 210 of the secondary battery 10 may be deformed with a relatively small force, moldability of the secondary battery 10 may be improved.

As described above, according to the one or more of the above embodiments of the present invention, a manufacturing efficiency of secondary batteries may be improved.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A secondary battery comprising:
   a can having an opening at one end;
   an electrode assembly accommodated in the can;
   a cap plate sealing the opening; and
   an insulation plate located between the cap plate and the electrode assembly,
   wherein the can comprises:
   a first planar side surface that is convex along a first direction;
   a second planar side surface that faces the first planar side surface and is concave along the first direction;
   a planar bottom surface that is substantially perpendicular to the first planar side surface and to the second planar side surface, the planar bottom surface having a length that extends in the first direction;
   a first connection portion that connects the first planar side surface and the planar bottom surface, wherein a cross-section in a plane perpendicular to the first direction of an interior-facing surface of the first connection portion extending between the first planar side surface and the planar bottom surface has a first radius of curvature; and a second connection portion that connects the second planar side surface and the planar bottom surface, wherein a cross-section in a plane perpendicular to the first direction of an interior-facing surface of the second connection portion extending between the second planar side surface and the planar bottom surface has a second radius of curvature, wherein at least one of the first radius of curvature and the second radius of curvature varies along the length of the planar bottom surface.

2. The secondary battery of claim 1, wherein at least one of the first radius of curvature and the second radius of curvature is bisymmetrical along the length of the planar bottom surface with respect to a center of the first planar side surface or a center of the second planar side surface, respectively.

3. The secondary battery of claim 1, wherein at least one of the first radius of curvature and the second radius of curvature increases along the length of the planar bottom surface from a center of the first planar side surface or a center of the second planar side surface, respectively, to an end of the planar bottom surface.

4. The secondary battery of claim 1, wherein at least one of the first radius of curvature and the second radius of curvature linearly varies along the length of the planar bottom surface from a center of the first planar side surface or a center of the second planar side surface, respectively, to an end of the planar bottom surface.

5. The secondary battery of claim 4, wherein at least one of the first radius of curvature and the second radius of curvature linearly increases along the length of the planar bottom surface from a center of the first planar side surface or a center of the second planar side surface, respectively, to an end of the planar bottom surface.

6. The secondary battery of claim 1, wherein the first radius of curvature at a point on the first connection portion is identical to the second radius of curvature at a point on the second connection portion facing the point on the first connection portion.

7. The secondary battery of claim 1, wherein the second radius of curvature at a point on the second connection portion is smaller than the first radius of curvature at a point on the first connection portion facing the point on the second connection portion.

8. The secondary battery of claim 1, wherein the first radius of curvature is uniform along the length of the planar bottom surface.

9. The secondary battery of claim 1, further comprising:
a terminal plate located between the insulation plate and the electrode assembly and electrically connected to the electrode assembly; and
an electrode pin located on the cap plate and passing through the cap plate and the insulation plate to be connected to the terminal plate.

* * * * *